(12) United States Patent
Zhu

(10) Patent No.: US 12,225,557 B2
(45) Date of Patent: Feb. 11, 2025

(54) METHOD AND DEVICE FOR PBCH TRANSMISSION MODE DETERMINATION

(71) Applicant: UNISOC (CHONGQING) TECHNOLOGIES CO., LTD., Chongqing (CN)

(72) Inventor: Zhihui Zhu, Chongqing (CN)

(73) Assignee: UNISOC (CHONGQING) TECHNOLOGIES CO., LTD., Chongqing (CN)

(*) Notice: Subject to any disclaimer, the term of this patent is extended or adjusted under 35 U.S.C. 154(b) by 397 days.

(21) Appl. No.: 17/734,003

(22) Filed: Apr. 30, 2022

(65) Prior Publication Data
US 2022/0264526 A1 Aug. 18, 2022

Related U.S. Application Data

(63) Continuation of application No. PCT/CN2020/093467, filed on May 29, 2020.

(30) Foreign Application Priority Data

Oct. 30, 2019 (CN) .......................... 201911047304.2

(51) Int. Cl.
*H04W 72/30* (2023.01)
*H04W 4/70* (2018.01)
*H04W 72/0446* (2023.01)
*H04W 72/0453* (2023.01)

(52) U.S. Cl.
CPC ............. *H04W 72/30* (2023.01); *H04W 4/70* (2018.02); *H04W 72/0446* (2013.01); *H04W 72/0453* (2013.01)

(58) Field of Classification Search
CPC ... H04W 72/30; H04W 4/70; H04W 72/0446; H04W 72/0453; H04W 4/80; H04W 72/23; H04L 1/0045; H04L 1/0072; H04L 1/1835; H04L 1/08; H04L 1/0038; H04L 1/0047; H04L 1/0054; H04L 1/0061; H04L 5/0053; H04L 5/14
See application file for complete search history.

(56) References Cited

U.S. PATENT DOCUMENTS

| 2015/0181575 A1* | 6/2015 | Ng .................. H04W 72/23 370/329 |
| 2018/0041857 A1* | 2/2018 | Ouchi ............... H04W 72/12 |
| 2019/0222377 A1* | 7/2019 | Liu ..................... H04L 5/14 |
| 2020/0244428 A1* | 7/2020 | Tirucherai Muralidharan ........... H04L 5/0053 |

* cited by examiner

*Primary Examiner* — Kiet Tang
(74) *Attorney, Agent, or Firm* — HAUPTMAN HAM, LLP

(57) ABSTRACT

A method for communication mode determination and a device for communication mode determination are provided in the disclosure. The method includes the following. Multiple pieces of first data are received at multiple first time-frequency resource locations, where the multiple first time-frequency resource locations are time-frequency resource locations for repeated physical broadcast channel (PBCH) transmission in enhanced machine-type communication (eMTC). The multiple pieces of first data are combined to obtain first combined data. The first combined data is decoded and checked. On condition that decoded data of the first combined data is checked to be correct, the communication mode is determined to be repeated PBCH transmission.

20 Claims, 6 Drawing Sheets

---

Receive a plurality of pieces of first data at a plurality of first time-frequency resource locations — S110

Combine the plurality of pieces of first data to obtain first combined data — S120

Decode and check the first combined data, and determine that the communication mode is repeated PBCH transmission on condition that decoded data of the first combined data is checked to be correct — S130

METHOD AND DEVICE FOR PBCH TRANSMISSION MODE DETERMINATION

CROSS-REFERENCE TO RELATED APPLICATION(S)

This application is a continuation of International Application No. PCT/CN2020/093467, filed May 29, 2020, which claims priority to Chinese Patent Application No. 201911047304.2, filed Oct. 30, 2019, the disclosures of which are hereby incorporated by reference in their entireties.

TECHNICAL FIELD

This disclosure relates to the field of communication technology, and particularly to a method and device for communication mode determination.

BACKGROUND

Before accessing a cell, a user equipment (UE) needs to obtain system information of the cell, so as to know how the cell is configured and to work normally in the cell. The system information is divided into a master information block (MIB) and multiple system information blocks (SIB). The MIB includes the most important and commonly used transmission parameters which are needed to obtain other information from the cell, and is transmitted on physical broadcast channel (PBCH). The cell may transmit PBCH repeatedly based on some considerations (e.g., to improve coverage), and accordingly, the UE needs to determine a PBCH transmission mode to allocate resources. However, the PBCH transmission mode cannot be determined accurately in the related art.

SUMMARY

In view of this, the disclosure provides a method for communication mode determination. The method is applied to a user equipment. The method comprises: receiving a plurality of pieces of first data at a plurality of first time-frequency resource locations, the plurality of first time-frequency resource locations being time-frequency resource locations for repeated physical broadcast channel (PBCH) transmission in enhanced machine-type communication (eMTC); combining the plurality of pieces of first data to obtain first combined data; and decoding and checking the first combined data, and determining that the communication mode is repeated PBCH transmission on condition that decoded data of the first combined data is checked to be correct.

In some implementations, the method further comprises: receiving second data at a second time-frequency resource location, wherein the second time-frequency resource location is a time-frequency resource location for non-repeated PBCH transmission; combining the plurality of pieces of first data and the second data to obtain second combined data; and decoding and checking the second data and the second combined data, and determining that the communication mode is non-repeated PBCH transmission on condition that the decoded data of the first combined data is checked to be incorrect, decoded data of the second data is checked to be correct, and decoded data of the second combined data is checked to be incorrect.

In some implementations, the method further comprises: determining that the communication mode is repeated PBCH transmission, on condition that the decoded data of the first combined data is checked to be incorrect, the decoded data of the second data is checked to be incorrect, and the decoded data of the second combined data is checked to be correct.

In some implementations, the method further comprises: converting the first combined data to obtain first converted data and converting the second data to obtain second converted data, on condition that the decoded data of the first combined data is checked to be incorrect, the decoded data of the second data is checked to be correct, and the decoded data of the second combined data is checked to be correct; determining a first similarity between the decoded data of the first combined data and the first converted data, and determining a second similarity between the decoded data of the second data and the second converted data; and determining the communication mode according to the first similarity and the second similarity.

In some implementations, determining the communication mode according to the first similarity and the second similarity comprises: determining that the communication mode is repeated PBCH transmission, on condition that the first similarity is higher than the second similarity; and determining that the communication mode is non-repeated PBCH transmission, on condition that the first similarity is lower than or equal to the second similarity.

In some implementations, converting the first combined data to obtain the first converted data comprises: converting the first combined data into the first converted data according to a positive/negative sign of each piece of data in the first combined data, wherein the first converted data comprises a plurality of pieces of binary data which is same in amount as data comprised in the first combined data. Determining the first similarity between the decoded data of the first combined data and the first converted data comprises: for each bit of the decoded data of the first combined data, comparing the bit of the decoded data of the first combined data with a corresponding bit of the first converted data to determine a first amount of the same numerical value; and determining a ratio of the first amount to the amount of data in the first combined data as the first similarity.

In some implementations, converting the second data to obtain the second converted data comprises: converting the second data into the second converted data according to a positive/negative sign of each piece of data in the second data, wherein the second converted data comprises a plurality of pieces of binary data which is same in amount as data comprised in the second data. Determining the second similarity between the decoded data of the second data and the second converted data comprises: for each bit of the decoded data of the second data, comparing the bit of the decoded data of the second data with a corresponding bit of the second converted data to determine a second amount of the same numerical value; and determining a ratio of the second amount to the amount of data in the second data as the second similarity.

In some implementations, the method further comprises: determining the communication mode by receiving in a next time window a plurality of pieces of first data and/or second data, on condition that the decoded data of the first combined data is checked to be incorrect, the decoded data of the second data is checked to be incorrect, and the decoded data of the second combined data is checked to be incorrect.

In another aspect of the disclosure, a device for communication mode determination is provided. The device comprises a transceiver, a processor, and a memory. The processor is coupled with the transceiver. The memory is coupled with the transceiver and the processor, and stores processor-executable instructions which, when executed by the processor, cause the processor to execute the above method.

In another aspect of the disclosure, a non-transitory computer-readable storage medium is provided. The non-transitory computer-readable storage medium stores computer program instructions which, when executed by a computer, cause the computer to execute the above method.

Exemplary implementations will be described in detail with reference to accompanying drawings described below, and other features and aspects of the disclosure will become clear.

BRIEF DESCRIPTION OF THE DRAWINGS

Accompanying drawings contained in the specification and constituting a part of the specification together with the specification illustrate exemplary implementations, features, and aspects of the disclosure, and are used to explain the principles of the disclosure.

DETAILED DESCRIPTION

Figure 1:
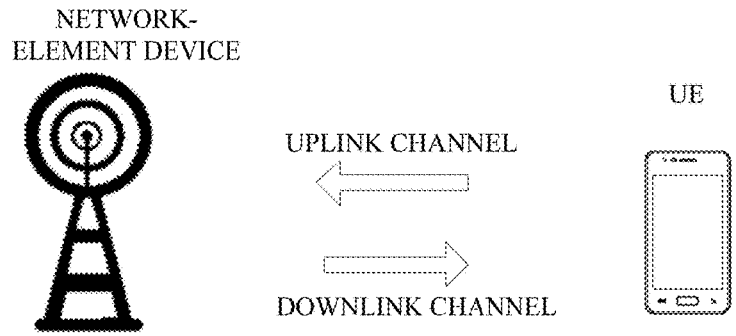
FIG. 1 is a schematic diagram illustrating a communication system according to implementations of the disclosure.

Hereinafter, exemplary implementations, features, and aspects of the disclosure will be described in detail with reference to accompanying drawings. The same reference numerals in the accompanying drawings denote elements having a same or similar function. While various aspects of the implementations are illustrated in the accompanying drawings, the accompanying drawings are not necessarily drawn to scale unless otherwise indicated.

The term "exemplary" referred to herein means "serving as an example, implementation, or illustration". Any implementation described herein as "exemplary" is not necessarily to be construed as preferred or advantageous over other implementations.

In addition, in order to better illustrate the disclosure, various specific details are given in the detailed implementations described below. Those skilled in the art should understand that the disclosure can also be implemented without certain specific details. In some implementations, methods, means, components, and circuits well known to those skilled in the art have not been described in detail, to highlight the subject matter of the disclosure.

Implementations of the disclosure may be applicable to a 5th generation (5G) communication system, and may also be applicable to a 4th generation (4G) communication system, a 3rd generation (3G) communication system, a satellite communication system, and various future evolved communication systems, such as a 6th generation (6G) communication system, a 7th generation (7G) communication system, etc.

The implementations of the disclosure may also be applicable to different network architectures. The network architecture includes, but is not limited to, a relay network architecture, a dual-link architecture, and a vehicle-to-everything (vehicle-to-everything communication) architecture.

"5G CN" in implementations of the disclosure may also be referred to as anew core network, a 5G new core, a next generation core (NGC), or the like. 5G CN is set up independently of an existing core network, such as an evolved packet core (EPC).

"Network-element device" in implementations of the disclosure may be a base station (BS) which may also be referred to as base station device. The network-element device is a device providing a wireless communication function and deployed in a radio access network (RAN). For example, a device for providing a base station function in a 2nd generation (2G) network includes a base transceiver station (BTS) and a base station controller (BSC). A device for providing a base station function in a 3G network includes a NodeB and a radio network controller (RNC). A device for providing a base station function in a 4G network includes an evolved NodeB (eNB). A device for providing a base station function in a wireless local area network (WLAN) is an access point (AP). A device for providing a base station function in 5G new radio (NR) includes a gNodeB (gNB) and a device for providing a base station function in a future communication system.

"User equipment (UE)" in implementations of the disclosure may refer to various forms of access terminals, subscriber units, subscriber stations, mobile stations (MS), remote stations, remote terminals, and mobile equipment, user terminals, terminal equipment, wireless communication equipment, user agents, or user device. The UE may also be a cellular telephone, a cordless telephone, a session initiation protocol (SIP) telephone, a wireless local loop (WLL) station, a personal digital assistant (PDA), a handheld device with a wireless communication function, a computing device, other processing devices coupled with a wireless modem, an in-vehicle device, a wearable device, user equipment in a future 5G network or terminal equipment in a future evolved public land mobile network (PLMN), etc., which is not limited in implementations of the disclosure.

Detailed description will be given below.

According to implementations, a method for communication mode determination is provided. The method is applied to a UE. The method includes: receiving a plurality of pieces of first data at a plurality of first time-frequency resource locations, the plurality of first time-frequency resource locations being time-frequency resource locations for repeated physical broadcast channel (PBCH) transmission in enhanced machine-type communication (eMTC); combining the plurality of pieces of first data to obtain first combined data; and decoding and checking the first combined data, and determining that the communication mode is repeated PBCH transmission on condition that decoded data of the first combined data is checked to be correct.

According to implementations, a device for communication mode determination is provided. The device includes a transceiver, a processor, and a memory. The processor is coupled with the transceiver. The memory is coupled with the transceiver and the processor, and stores processor-executable instructions which, when executed by the processor, cause the processor to execute the above method.

According to implementations, a non-transitory computer-readable storage medium is provided. The non-transitory computer-readable storage medium stores computer program instructions which, when executed by a computer, cause the computer to execute the above method.

FIG. 1 is a schematic diagram illustrating a communication system according to implementations of the disclosure. Various implementations of the disclosure can be applicable to the communication system illustrated in FIG. 1. The following definitions are given in implementations of the disclosure: one-way communication link from an access network to the UE is a downlink, data transmitted on the downlink is downlink data, and a transmission direction of the downlink data is referred to as a downlink direction; on the contrary, one-way communication link from the UE to the access network is an uplink, data transmitted on the uplink is uplink data, and a transmission direction of the uplink data is referred to as an uplink direction.

It should be understood that, the term "and/or" herein merely describes an association relationship between associated objects, which means that there can be three relationships. For example, "A and/or B" can mean A alone, both A and B exist, and B alone. In addition, the character "/" herein generally indicates that the associated objects are in an "or" relationship.

The term "connection" in implementations of the disclosure refers to various connection manners such as direct connection or indirect connection for communication between devices, which is not limited in implementations of the disclosure.

The term "network" and "system" in implementations of the disclosure express a same concept, and a communication system may also be referred to as a communication network. The term "connection" in implementations of the disclosure refers to various connection manners such as direct connection or indirect connection, for example, a connection between different devices through a communication interface, which is not limited herein.

Figure 2:
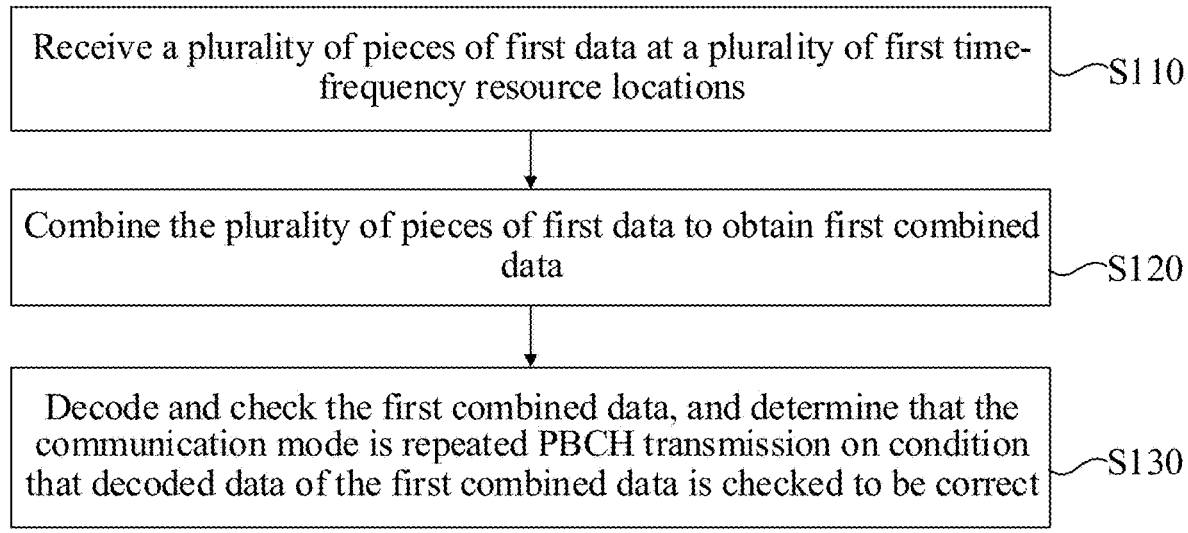
FIG. 2 is a schematic flowchart illustrating a method for communication mode determination according to implementations of the disclosure.

Referring to FIG. 2, FIG. 2 is a schematic flowchart illustrating a method for communication mode determination according to implementations of the disclosure. The method is applied to a UE and includes the following.

At S110, receiving multiple pieces of first data at multiple first time-frequency resource locations, where the multiple first time-frequency resource locations are time-frequency resource locations for repeated PBCH transmission in eMTC.

At S120, combining the multiple pieces of first data to obtain first combined data.

At S130, decoding and checking the first combined data, and determining that the communication mode is repeated PBCH transmission on condition that decoded data of the first combined data is checked to be correct.

According to the above method of implementations of the disclosure, the multiple pieces of first data are received at the first time-frequency resource locations for repeated PBCH transmission in eMTC. The multiple pieces of first data are combined to obtain the first combined data. The first combined data is decoded and checked. If the checking is correct, it is determined that PBCH is transmitted repeatedly by a network-element device. In implementations of the disclosure, data at the first time-frequency resource locations for repeated PBCH transmission in eMTC is combined directly and then combined data is decoded and checked. As such, whether the network-element device transmits PBCH repeatedly can be determined quickly and accurately. Once the communication mode is determined, computing resources can be configured based on different communication modes of PBCH transmission, thereby improving communication efficiency and computing efficiency.

It should be noted that, an implementation of data combining is not limited in implementations of the disclosure, and those skilled in the art may determine the manner of data combining with reference to relevant technologies. For example, soft combining (which can be regarded as weighted addition) is adopted for combining.

In some implementations, data decoding (e.g., Viterbi decoding) may correspond to data encoding at the network-element device, and data checking may adopt cyclic redundancy check (CRC) or other manners. Implementations of the data decoding and the data checking are not limited in the disclosure, and those skilled in the art can determine, according to actual needs, appropriate manners for the data decoding and the data checking.

In some implementations, both the first data and second data described below are information carried in PBCH, for example, the information includes a master information block (MIB).

As an example, data carried in PBCH repeatedly transmitted by the network-element device may be the same, that is, if the network-element device transmits PBCH repeatedly, if there is no interference and no error, the first data and the second data may be the same in one transmission.

It should be noted that, a variety of first time-frequency resource locations can be used for repeated PBCH transmission in eMTC, and configuration of the first time-frequency resource location is not limited in the disclosure.

In order to better illustrate the disclosure, the first time-frequency resource location will be exemplarily described below.

Figure 3A:
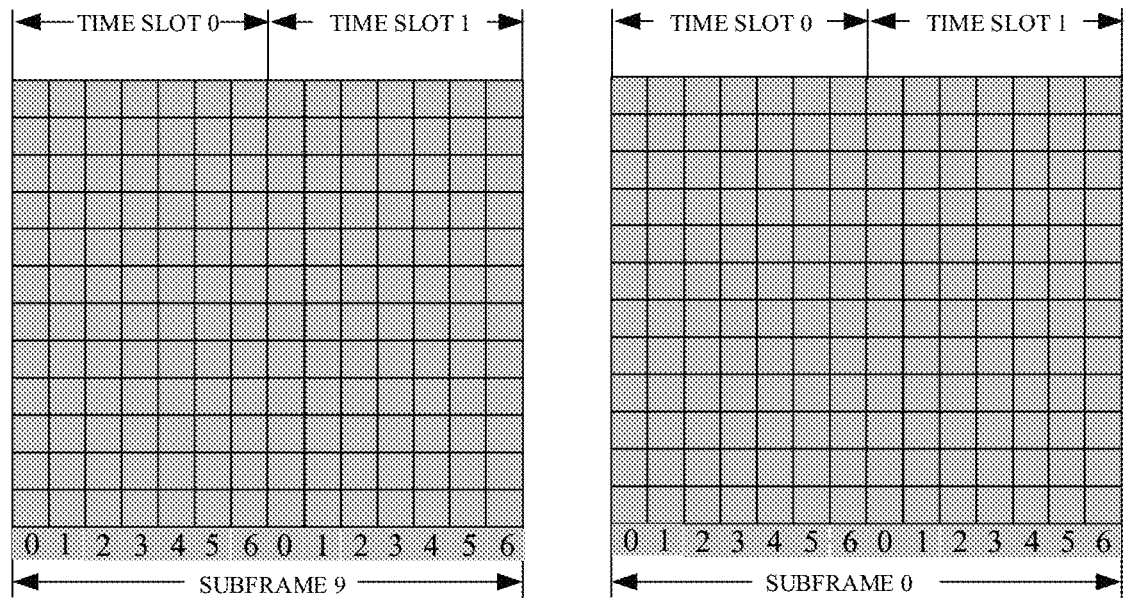
FIGS. 3A-3B are schematic diagrams illustrating time-frequency resources for PBCH transmission according to implementations of the disclosure.
Figure 3B:
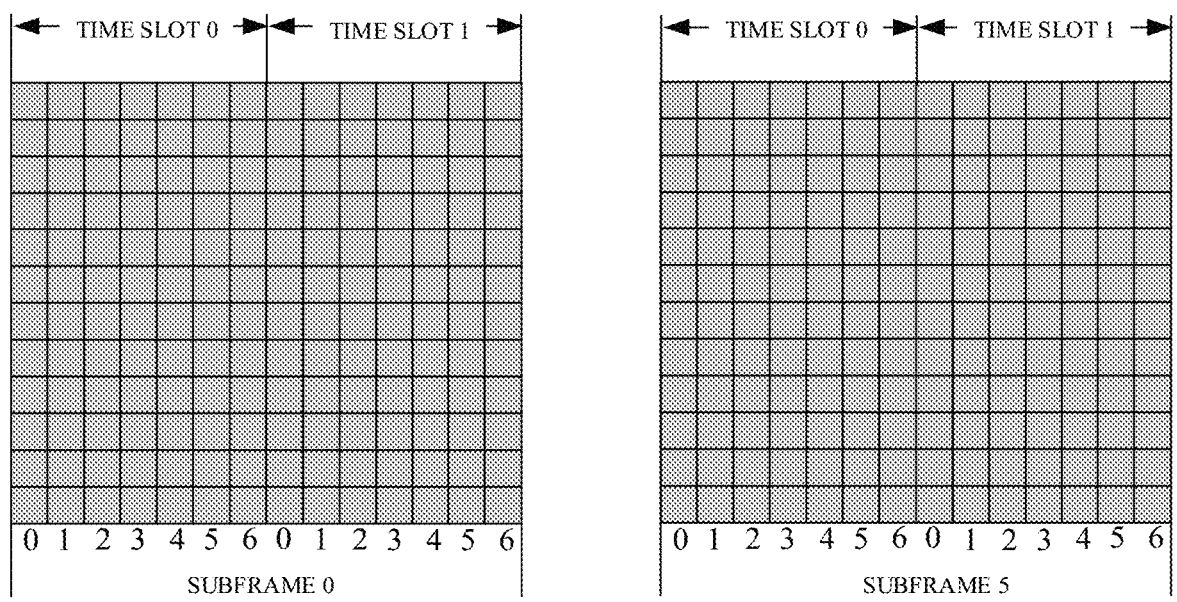

Referring to FIGS. 3A-3B, FIGS. 3A-3B are schematic diagrams illustrating time-frequency resources for PBCH transmission according to implementations of the disclosure.

Referring to FIG. 3A, in a frequency division duplexing (FDD) mode, the first time-frequency resource location of eMTC may include orthogonal frequency division multiplexing (OFDM) symbols 3 to 6 of time slot 0 of subframe 9, and OFDM symbols 0 to 6 of time slot 1 of subframe 9, OFDM symbols 3 to 4 of time slot 0 of subframe 0, and OFDM symbols 4-6 of time slot 1 of subframe 0.

Referring to FIG. 3B, in a time division duplexing (TDD) mode, the first time-frequency resource location of eMTC may include OFDM symbols 3 to 6 of time slot 0 of subframe 0, and OFDM symbols 4 to 6 of time slot 1 of subframe 0, OFDM symbols 3 to 6 of time slot 0 of subframe 5, and OFDM symbols 0 to 6 of time slot 1 of subframe 5.

In some implementations, in the TDD mode, if a system bandwidth is 3 MHz, PBCH is only transmitted repeatedly in subframe 0, and is not transmitted in subframe 5. If the system bandwidth is 1.4 MHz, PBCH is not transmitted repeatedly in subframe 0 and subframe 5, that is, PBCH is not transmitted on a first time-frequency resource.

Of course, the above description of the first time-frequency resource location is exemplary and should not be regarded as a limitation of the disclosure.

It should be noted that, although the first time-frequency resource location of eMTC in the TDD mode and the FDD mode has been generally introduced above, the first time-frequency resource location selected by the network-element device is unfixed. That is, the network-element device may transmit PBCH repeatedly on all resources of the first time-frequency resource location described above, or may select some resources for transmission if needed, which is not limited in the disclosure.

The network-element device may determine the first time-frequency resource locations according to the protocol, and according to needs, decide which time-frequency resources are used to transmit PBCH repeatedly or decide whether to transmit PBCH repeatedly on a first time-frequency resource. However, the UE does not know whether the network-element device transmits PBCH repeatedly. Therefore, the UE needs to determine whether the network-element device transmits PBCH repeatedly according to data transmitted by the network-element device.

According to the above method of implementations of the disclosure, data of first time-frequency resources is combined, decoded, and checked to determine whether the network-element device transmits PBCH repeatedly. If the decoded data of the first combined data is checked to be correct, the communication mode is determined to be repeated PBCH transmission. On the other hand, if the decoded data of the first combined data is checked to be incorrect, further determination will be performed. The following will exemplarily describe determining whether the communication mode is repeated PBCH transmission when the decoded data of the first combined data is checked to be incorrect.

In some implementations, the method further includes: receiving second data at a second time-frequency resource location, where the second time-frequency resource location is a time-frequency resource location for non-repeated PBCH transmission; combining the multiple pieces of first data and the second data to obtain second combined data; and decoding and checking the second data and the second combined data, and determining that the communication mode is non-repeated PBCH transmission on condition that the decoded data of the first combined data is checked to be incorrect, decoded data of the second data is checked to be correct, and decoded data of the second combined data is checked to be incorrect.

According to the above method of implementations of the disclosure, when the first combined data is checked to be incorrect, the second data is received at the second time-frequency resource location, the multiple pieces of first data and the second data are combined to obtain the second combined data, and the second data and the second combined data are decoded and checked respectively, to determine the communication mode according to check results.

The second time-frequency resource location will be exemplarily described below.

Referring to FIGS. 3A-3B again, as illustrated in FIG. 3A and FIG. 3B, for FDD and TDD, the second time-frequency resource location may include OFDM symbols 0 to 3 of time slot 1 of subframe 0.

Since the second combined data is obtained by combining the multiple pieces of first data and the second data, if the decoded data of the first combined data is checked to be incorrect and the decoded data of the second combined data is checked to be incorrect, it is determined that PBCH is not transmitted by the network-element device at the first time-frequency resource locations in present transmission. In implementations of the disclosure, if the decoded data of the second data is checked to be correct, it is determined that PBCH is transmitted by the network-element device at the second time-frequency resource location.

In implementations of the disclosure, when the decoded data of the first combined data is checked to be incorrect, a mode in which the network-element device transmits PBCH is further determined based on results of decoding and checking of the second data and the second combined data. However, there are several combinations of check results of the decoded data of the second data and the decoded data of the second combined data, and the communication mode may vary with the combination. For example, as described above, in implementations of the disclosure, on condition that the decoded data of the first combined data is checked to be incorrect, the decoded data of the second data is checked to be correct, and the decoded data of the second combined data is checked to be incorrect, the communication mode is determined to be non-repeated PBCH transmission. Of course, the disclosure also includes other implementations, to determine the communication mode according to the check results of the decoded data of the second data and the decoded data of the second combined data when the decoded data of the first combined data is checked to be incorrect, which will be exemplarily described below.

In some implementations, the method for communication mode determination further includes: determining that the communication mode is repeated PBCH transmission, on condition that the decoded data of the first combined data is checked to be incorrect, the decoded data of the second data is checked to be incorrect, and the decoded data of the second combined data is checked to be correct.

Since the second combined data is obtained by combining the multiple pieces of first data and the second data, if the decoded data of the second combined data is checked to be correct, it is determined that PBCH is transmitted repeatedly by the network-element device. However, the decoded data of the first combined data or the decoded data of the second data being checked to be incorrect may be caused by various reasons. As an example, transmission of the multiple pieces of first data (or the second data) suffers severe interference, which causes errors in the repeatedly transmitted first data (or the second data). Since the second data and the multiple pieces of first data are combined in implementations of the disclosure, transmitted data can be corrected to a certain extent. When the network-element device transmits PBCH repeatedly, even if the interference causes transmission errors when transmitting the multiple pieces of first data or the second data, combining the multiple pieces of first data and the second data can calibrate the transmitted data to a certain extent, and therefore, it is possible to obtain correct data.

In some implementations, the method for communication mode determination further includes: converting the first combined data to obtain first converted data and converting the second data to obtain second converted data, on condition that the decoded data of the first combined data is checked to be incorrect, the decoded data of the second data is checked to be correct, and the decoded data of the second combined data is checked to be correct; determining a first similarity between the decoded data of the first combined data and the first converted data, and determining a second similarity between the decoded data of the second data and the second converted data; and determining the communication mode according to the first similarity and the second similarity.

On condition that the decoded data of the first combined data is checked to be incorrect, the decoded data of the second data is checked to be correct, and the decoded data of the second combined data is checked to be correct, it does not rule out the possibility of errors in data transmission, and thus, whether the communication mode is repeated PBCH transmission cannot be determined directly. According to the above method of implementations of the disclosure, the first combined data and the second data can be converted, the first similarity and the second similarity can be obtained based on the first converted data and the second converted data obtained, and the communication mode can be determined according to the first similarity and the second similarity, which is simple and can determine the communication mode quickly and accurately.

In terms of converting, the first combined data and the second data may be converted in the same way into a data form that is convenient to determine the similarity, such as binary data. As an example, a positive sign bit is converted to 0 (or 1) and a negative sign bit is converted to 1 (or 0), in this way, the first combined data is converted into binary data according to a sign(s) of the first combined data, and the second data is converted into binary data according to a sign(s) of the second data. The expression of the similarity between data before converting and data after converting can be selected according to needs, which is not limited in the disclosure.

In some implementations, determining the communication mode according to the first similarity and the second similarity includes: determining that the communication mode is repeated PBCH transmission, on condition that the first similarity is higher than the second similarity; and determining that the communication mode is non-repeated PBCH transmission, on condition that the first similarity is lower than or equal to the second similarity.

The more similar the first converted data and the first combined data are, the higher the first similarity; the more similar the second converted data and the second data are, the higher the second similarity. The similarity between data represents a degree of similarity between the data. As an example, if two pieces of data are identical, a similarity between the two pieces of data is 100%. As another example, if two pieces of data are completely different, a similarity between the two pieces of data is 0.

In implementation of the disclosure, on condition that the first similarity is higher than the second similarity, it is determined that PBCH is transmitted repeatedly by the network-element device. As such, when the decoded data of the first combined data is checked to be incorrect, the decoded data of the second data is checked to be correct, and the decoded data of the second combined data is checked to be correct, a transmission mode can be further determined accurately based on the similarity.

In some implementations, converting the first combined data to obtain the first converted data includes: converting the first combined data into the first converted data according to a positive/negative sign of each piece of data in the first combined data, where the first converted data includes multiple pieces of binary data which is same in amount as data included in the first combined data.

As an example, positive data is converted to "0" and negative data is converted to "1".

If signs of the data included in the first combined data are "positive, positive, positive, negative, positive, negative, negative", the first converted data is "0001011,".

Of course, the above description of the manner of data converting is exemplary and should not be regarded as a limitation of the disclosure. The disclosure does not limit an implementation of the data converting.

In some implementations, determining the first similarity between the decoded data of the first combined data and the first converted data includes: for each bit of the decoded data of the first combined data, comparing the bit of the decoded data of the first combined data with a corresponding bit of the first converted data to determine a first amount of the same numerical value; and determining a ratio of the first amount to the amount of data in the first combined data as the first similarity.

The decoded data of the first combined data for example is "0001010", by "comparing each bit of the decoded data of the first combined data with each bit of the first converted data to determine a first amount of the same numerical value", the first converted data (e.g., 0001011) has 6 bits (i.e., the first amount is 6) which are the same as the decoded data of the first combined data. By "determining a ratio of the first amount to the amount of data in the first combined data as the first similarity", the first similarity is determined to be "6/7".

In some implementations, converting the second data to obtain the second converted data includes: converting the second data into the second converted data according to a positive/negative sign of each piece of data in the second data, where the second converted data includes multiple pieces of binary data which is same in amount as data included in the second data.

If signs of the data included in the second data are "positive, positive, positive, negative, positive, negative, negative", the second converted data is "0001011".

In some implementations, determining the second similarity between the decoded data of the second data and the second converted data includes: for each bit of the decoded data of the second data, comparing the bit of the decoded data of the second data with a corresponding bit of the second converted data to determine a second amount of the same numerical value; and determining a ratio of the second amount to the amount of data in the second data as the second similarity.

The decoded data of the second data for example is "0001000", by "comparing each bit of the decoded data of the second data with each bit of the second converted data to determine a second amount of the same numerical value", the second amount of same numerical values between the second converted data (e.g., 0001011) and the decoded data (e.g., 0001000) of the second data is determined to be "5". By "determining a ratio of the second amount to the amount of data in the second data as the second similarity", the second similarity is determined to be "5/7".

Further, since the first similarity "6/7" is higher than the second similarity "5/7", according to "determining that the communication mode is repeated PBCH transmission, on condition that the first similarity is higher than the second similarity", it is determined that PBCH is transmitted repeatedly by the network-element device.

Of course, the above description is exemplary, and the first combined data and the second data may have other positive and negative relationships, which is not limited in the disclosure.

It should be understood that, implementations of the disclosure describe that the communication mode is determined based on a relationship between the first similarity and the second similarity. In other implementations, information power of the first combined data and the second data is determined, and the communication mode is determined according to average power of the first combined data and average power of the second data. An implementation of determining the communication mode according to the information power is not limited in the disclosure, and those skilled in the art can determine a specific comparison method according to different scenarios and needs to determine the communication mode.

It should be noted that, PBCH transmission has a period of 40 ms specified in a protocol. The above describes a situation where PBCH is transmitted for the first time in the period of 40 ms. When PBCH is transmitted for the first time, whether the communication mode of eMTC is repeated PBCH transmission can be determined according to check results of the decoded data of the first combined data, the decoded data of the second data, and the decoded data of the second combined data. However, if large errors occur during transmission of first data at the first time-frequency resource location and transmission of second data at the second time-frequency resource location, for example, the decoded data of the first combined data is checked to be incorrect, the decoded data of the second data is checked to be incorrect, and the decoded data of the second combined data is checked to be incorrect, in this case, it is difficult to determine whether PBCH is transmitted repeatedly according to one transmission. Therefore, in implementations of the disclosure, whether PBCH is transmitted repeatedly is further determined in a next PBCH period.

In some implementations, the method further includes: determining the communication mode by receiving in a next time window multiple pieces of first data and/or second data, on condition that the decoded data of the first combined data is checked to be incorrect, the decoded data of the second data is checked to be incorrect, and the decoded data of the second combined data is checked to be incorrect.

As an example, in implementations of the disclosure, multiple pieces of first data and second data corresponding to first 10 ms are cached to a storage medium (in this case, second combined data can be calculated according to the multiple pieces of first data and the second data), or multiple pieces of first data and second combined data are cached to the storage medium (in this case, second data can be calculated according to the multiple pieces of first data and the second combined data), or first combined data and second data are cached to the storage medium.

If the decoded data of the first combined data being checked to be incorrect, the decoded data of the second data being checked to be incorrect, and the decoded data of the second combined data being checked to be incorrect occur in a present transmission of 10 ms, first data and second data of a next 10 ms are received in a next PBCH period, and the first data and the second data of the next 10 ms (e.g., a next time window) and the first data and the second data of a previous 10 ms are combined (e.g., soft combining, an implementation of combining is not limited in the disclosure). Whether the communication mode is repeated PBCH transmission can be determined based on combined multiple pieces of first data and combined second data by means of the above method.

It should be noted that, when the decoded data of the first combined data is checked to be incorrect, the decoded data of the second data is checked to be incorrect, and the decoded data of the second combined data is checked to be incorrect, a determination method of the communication mode is similar to the above determination method, which will not be repeated herein.

Figure 4:
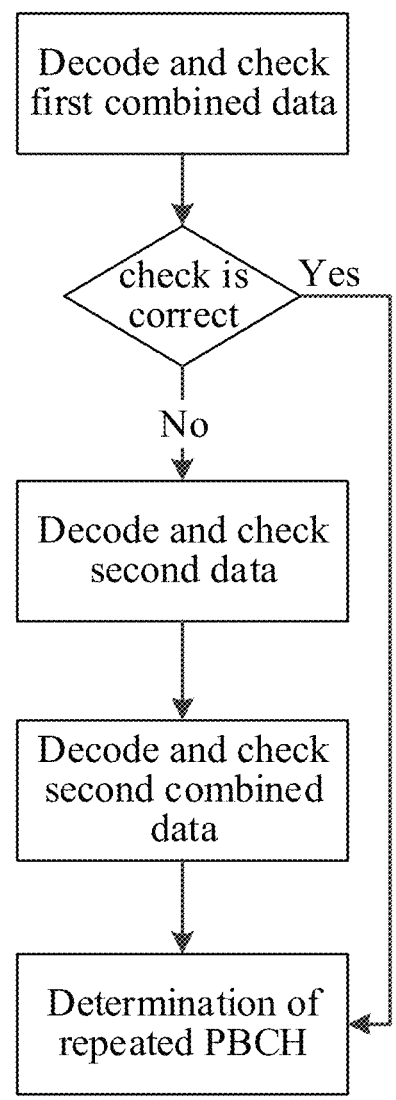
FIG. 4 is a schematic diagram illustrating a method for communication mode determination according to implementations of the disclosure.

Referring to FIG. 4, FIG. 4 is a schematic diagram illustrating a method for communication mode determination according to implementations of the disclosure.

As illustrated in FIG. 4, in implementations of the disclosure, the multiple pieces of first data received at the first time-frequency resource locations are combined to obtain the first combined data, and the first combined data is decoded and checked. If the decoded data of the first combined data is checked to be correct, the communication mode is directly determined to be repeated PBCH transmission, and a determination process is ended.

In the disclosure, if the decoded data of the first combined data is checked to be incorrect, the second data is decoded and checked, and the second combined data obtained by combining the multiple pieces of first data and the second data is decoded and checked, so as to determine the communication mode according to a check result of the decoded data of the second data and a check result of the decoded data of the second combined data.

It should be noted that, when the decoded data of the first combined data is checked to be incorrect, the communication mode can be further determined based on the check results of the decoded data of the second data and the decoded data of the second combined data. For the details of determining the communication mode, reference can be made to the foregoing description, which will not be repeated herein.

It should be noted that, in implementations of the disclosure, when receiving the first data at the first time-frequency resource locations and receiving the second data at the second time-frequency resource location, other communication processes may also be performed.

Figure 5:
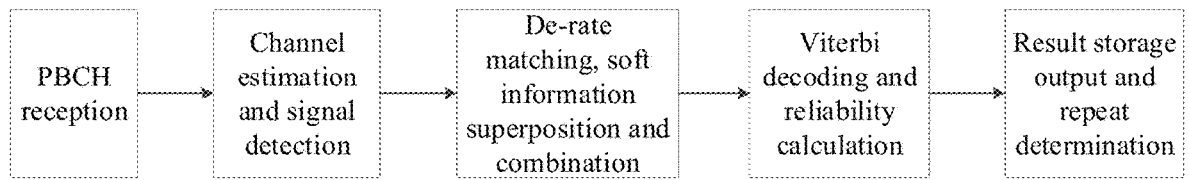
FIG. 5 is a schematic diagram illustrating a method for communication mode determination according to implementations of the disclosure.

Referring to FIG. 5, FIG. 5 is a schematic diagram illustrating a method for communication mode determination according to implementations of the disclosure.

As illustrated in FIG. 5, a receiver of the UE may perform the following operations to determine the communication mode.

First, PBCH reception is performed, information carried at the first time-frequency resource locations and the second time-frequency resource location is received through an antenna, and the information received is subjected to down-conversion, filtering, and other processes from a radio frequency signal to a baseband signal.

In a receiving process, channel estimation and signal detection are performed simultaneously, for example, including channel type estimation, channel parameter estimation, signal detection, timing, frequency offset, and other compensation processes.

Then, de-rate matching is performed on received data to obtain multiple pieces of first data and second data, and then processes such as soft information combination and superposition are performed. The processes include combining the multiple pieces of first data to obtain first combined data, and combining the multiple pieces of first data and the second data to obtain second combined data.

The first combined data is decoded and checked to determine whether decoded data of the first combined data is correct, the second data is decoded and checked to determine whether decoded data of the second data is correct, and the second combined data is decoded and checked to determine whether decoded data of the second combined data is correct, so as to determine whether the network-element device transmits PBCH repeatedly according to different check results. It should be noted that, the implementation of determining the communication mode will not be described herein, and for the detailed operations and the detailed method, reference can be made to the foregoing description. Of course, in implementations of the disclosure, when determining whether PBCH is transmitted repeatedly, implementations such as repeated transmission with a 40 ms period, blind detection of different numbers of antennas, and cross-subframe combining may be further performed, which will not be repeated herein.

In order to obtain complete system information, the UE also performs blind detection when receiving PBCH. In implementations of the disclosure, during the blind detection of multiple decoding, the combined data of the first data at the first time-frequency resource locations is decoded first, and then the second data at the second time-frequency resource location is decoded, and finally, the second combined data is decoded.

In implementations of the disclosure, after the communication mode is determined, intermediate data and results of a determination process are stored.

It should be understood that, the above description is exemplary, which should not be construed as a limiting of the disclosure.

Figure 6:
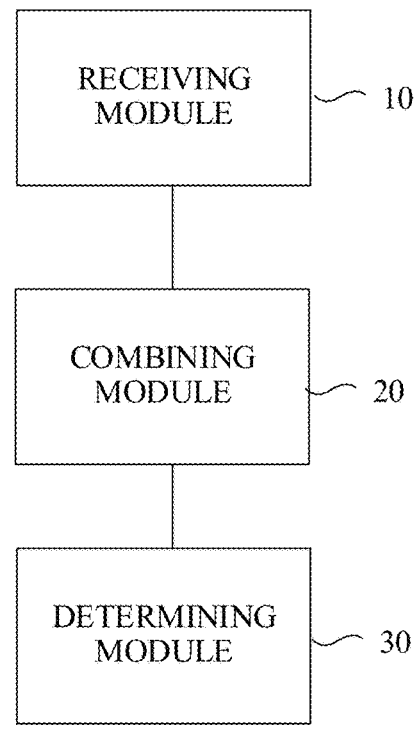
FIG. 6 is a block diagram illustrating a device for communication mode determination according to implementations of the disclosure.

Referring to FIG. 6, FIG. 6 is a block diagram illustrating a device for communication mode determination according to implementations of the disclosure.

The device is applied to a UE. As illustrated in FIG. 6, the device includes a receiving module 10, a combining module 20, and a determining module 30. The receiving module 10 is configured to receive multiple pieces of first data at multiple first time-frequency resource locations, where the multiple first time-frequency resource locations are time-frequency resource locations for repeated PBCH transmission in eMTC. The combining module 20 is coupled with the receiving module 10 and configured to combine the multiple pieces of first data to obtain first combined data. The determining module 30 is coupled with the combining module 20, and configured to decode and check the first combined data, and determine that the communication mode is repeated PBCH transmission on condition that decoded data of the first combined data is checked to be correct.

According to the above device of implementations of the disclosure, the multiple pieces of first data are received at the first time-frequency resource locations for repeated PBCH transmission in eMTC. The multiple pieces of first data are combined to obtain the first combined data. The first combined data is decoded and checked. If the checking is correct, it is determined that PBCH is transmitted repeatedly by a network-element device. In implementations of the disclosure, data at the first time-frequency resource locations for repeated PBCH transmission in eMTC is combined directly and then combined data is decoded and checked. As such, whether the network-element device transmits PBCH repeatedly can be determined quickly and accurately. Once the communication mode is determined, computing resources can be configured based on different communication modes of PBCH transmission, thereby improving communication efficiency and computing efficiency.

In some implementations, the receiving module is further configured to receive second data at a second time-frequency resource location, where the second time-frequency resource location is a time-frequency resource location for non-repeated PBCH transmission. The combining module is further configured to combine the multiple pieces of first data and the second data to obtain second combined data. The determining module is further configured to decode and check the second data and the second combined data, and determine that the communication mode is non-repeated PBCH transmission on condition that the decoded data of the first combined data is checked to be incorrect, decoded data of the second data is checked to be correct, and decoded data of the second combined data is checked to be incorrect.

In some implementations, the determining module is further configured to determine that the communication mode is repeated PBCH transmission, on condition that the decoded data of the first combined data is checked to be incorrect, the decoded data of the second data is checked to be incorrect, and the decoded data of the second combined data is checked to be correct.

In some implementations, the determining module is further configured to: convert the first combined data to obtain first converted data and convert the second data to obtain second converted data, on condition that the decoded data of the first combined data is checked to be incorrect, the decoded data of the second data is checked to be correct, and the decoded data of the second combined data is checked to be correct; determine a first similarity between the decoded data of the first combined data and the first converted data, and determine a second similarity between the decoded data of the second data and the second converted data; and determine the communication mode according to the first similarity and the second similarity.

In some implementations, the determining module configured to determine the communication mode according to the first similarity and the second similarity is configured to: determine that the communication mode is repeated PBCH transmission, on condition that the first similarity is higher than the second similarity; and determine that the communication mode is non-repeated PBCH transmission, on condition that the first similarity is lower than or equal to the second similarity.

In some implementations, the determining module configured to convert the first combined data to obtain the first converted data is configured to: convert the first combined data into the first converted data according to a positive/negative sign of each piece of data in the first combined data, where the first converted data includes multiple pieces of binary data which is same in amount as data comprised in the first combined data. The determining module configured to determine the first similarity between the decoded data of the first combined data and the first converted data is configured to: compare each bit of the decoded data of the first combined data with each bit of the first converted data to determine a first amount of the same numerical value; and determine a ratio of the first amount to the amount of data in the first combined data as the first similarity.

In some implementations, the determining module configured to convert the second data to obtain the second converted data is configured to: convert the second data into the second converted data according to a positive/negative sign of each piece of data in the second data, where the second converted data includes multiple pieces of binary data which is same in amount as data comprised in the second data. The determining module configured to determine the second similarity between the decoded data of the second data and the second converted data is configured to: compare each bit of the decoded data of the second data with each bit of the second converted data to determine a second amount of the same numerical value; and determine a ratio of the second amount to the amount of data in the second data as the second similarity.

In some implementations, the determining module is further configured to determine the communication mode by receiving in a next time window multiple pieces of first data and/or second data, on condition that the decoded data of the first combined data is checked to be incorrect, the decoded data of the second data is checked to be incorrect, and the decoded data of the second combined data is checked to be incorrect.

It should be noted that, the device for communication mode determination is a device corresponding to the foregoing method for communication mode determination. For details, reference can be made to the description of the foregoing method, which will not be repeated herein.

Figure 7:
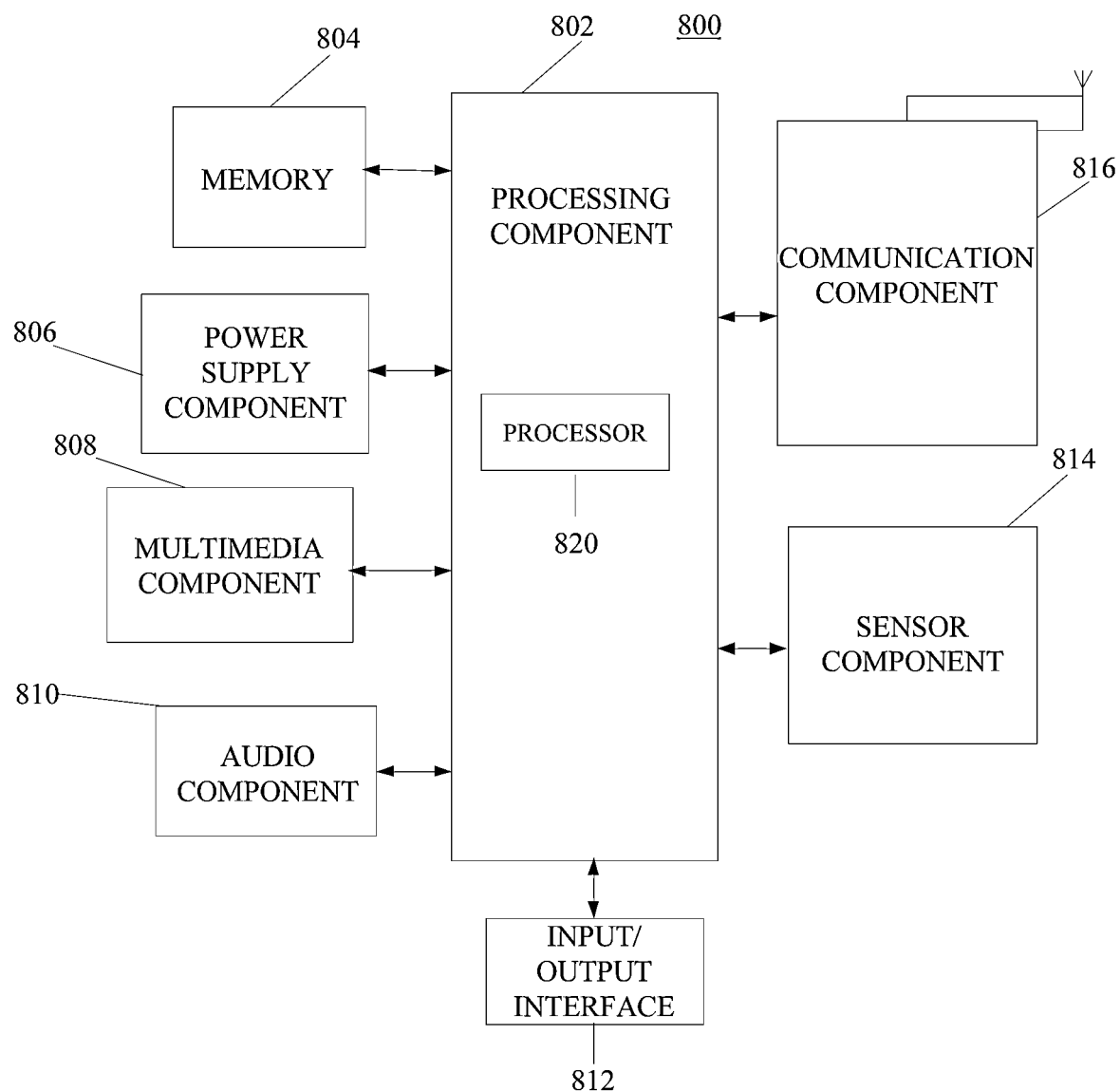
FIG. 7 is a block diagram illustrating a device for communication mode determination according to implementations of the disclosure.

Referring to FIG. 7, FIG. 7 is a block diagram illustrating a device for communication mode determination according to implementations of the disclosure.

As an example, a device 800 for communication mode determination may be a mobile phone, a computer, a device for digital broadcasting communication mode determination, a messaging device, a game console, a tablet device, a medical device, a fitness device, a personal digital assistant, and the like.

Referring to FIG. 7, the device 800 for communication mode determination may include one or more of the following components: a processing component 802, a memory 804, a power supply component 806, a multimedia component 808, an audio component 810, an input/output (I/O) interface 812, a sensor component 814, and a communication component 816.

Generally, the processing component 802 is configured to control the overall operation of the device 800 for communication mode determination, such as operations associated with display, telephone call, data communication, camera operations, and recording operations. The processing component 802 may include one or more processors 820 to execute instructions to complete all or part of the operations of the foregoing method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations in the device 800 for communication mode determination. Examples of these data include instructions for any application or method operated on the device 800 for communication mode determination, contact data, phonebook data, messages, pictures, videos, and the like. The memory 804 may be implemented by any type of transitory or non-transitory storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk.

The power supply component 806 is configured to provide power to various components of the device 800 for communication mode determination. The power supply component 806 may include a power management system, one or more power supplies, and other components associated with generating, managing, and allocating power for the device 800 for communication mode determination.

The multimedia component 808 may include a screen providing an output interface between the device 800 for communication mode determination and a user. In some implementations, the screen may include a liquid crystal display (LCD) and a touch panel (TP). If the screen includes a touch panel, the screen may be implemented as a touch screen to receive an input signal from the user. The touch panel may include one or more touch sensors to sense touch, sliding, and gestures on the touch panel. The touch sensor can not only sense the boundary of a touch or slide operation, but also detect a duration and pressure related to the touch or slide operation. In some implementations, the multimedia component 808 includes a front camera and/or a rear camera. When the device 800 for communication mode determination is in an operation mode, such as a shooting mode or a video mode, the front camera and/or the rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC) configured to receive an external audio signal when the device 800 for communication mode determination is in an operation mode, such as a call mode, a recording mode, and a speech recognition mode. The received audio signal may be further stored in the memory 804 or transmitted via the communication component 816. In some implementations, the audio component 810 further includes a speaker configured to output an audio signal.

The I/O interface 812 is configured to provide an interface between the processing component 802 and a peripheral interface module. The peripheral interface module may be a keyboard, a click wheel, a button, or the like. The button may include, but is not limited to, a home button, a volume button, a start button, and a lock button.

The sensor component 814 may include one or more sensors for providing state evaluation on various aspects for the device 800 for communication mode determination. As an example, the sensor component 814 detects an on/off state of the device 800 for communication mode determination and the relative positioning of the components, for instance, the components are the display and keypad of the device 800 for communication mode determination. The sensor component 814 can also detect position change of the device 800 for communication mode determination or a component of the device 800 for communication mode determination, presence or absence of user contact with the device 800 for communication mode determination, orientation or acceleration/deceleration of the device 800 for communication mode determination, and temperature change of the device 800 for communication mode determination. The sensor component 814 may include a proximity sensor configured to detect existence of nearby objects without any physical contact. The sensor component 814 may further include an optical sensor, such as a complementary metal oxide semiconductor (CMOS) or charge-coupled device (CCD) image sensor, for use in imaging applications. In some implementations, the sensor component 814 may further include an acceleration sensor, a gyroscope sensor, a magnetic sensor, a pressure sensor, or a temperature sensor.

The communication component 816 is configured to facilitate wired or wireless communication between the device 800 for communication mode determination and other devices. The device 800 for communication mode determination can access a wireless network based on a communication standard, such as wireless fidelity (WiFi), 2G or 3G, or a combination thereof. In an exemplary implementation, the communication component 816 includes a transceiver to receive a broadcast signal or broadcast related information from an external broadcast management system via a broadcast channel. In an exemplary implementation, the communication component 816 further includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In an exemplary implementation, the device 800 for communication mode determination may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, to execute the foregoing method.

In an exemplary implementation, a non-transitory computer-readable storage medium is further provided, for example, the memory 804 for storing computer program instructions. The computer program instructions are operable with the processor 820 of the device 800 for communication mode determination to execute the foregoing method.

Figure 8:
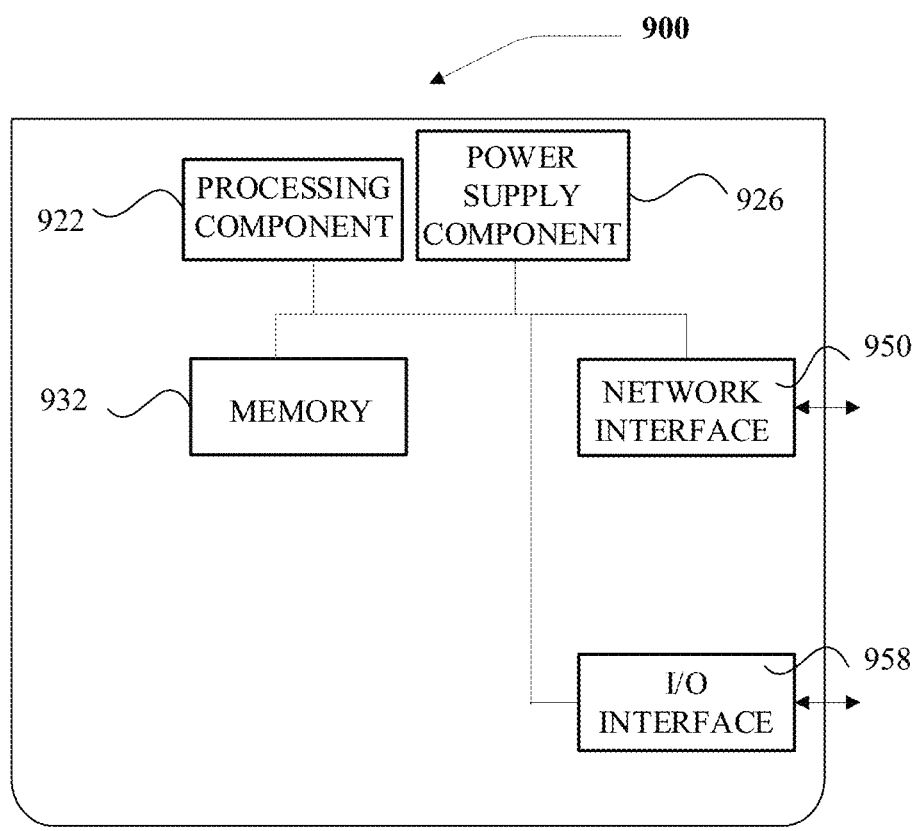
FIG. 8 is a block diagram illustrating a device for communication mode determination according to implementations of the disclosure.

Referring to FIG. 8, FIG. 8 is a block diagram illustrating a device for communication mode determination according to implementations of the disclosure.

As an example, a device 900 for communication mode determination can be provided as a server. Referring to FIG. 8, the device 900 for communication mode determination includes a processing component 922 which further includes one or more processors, and memory resources represented by a memory 932 and configured to store instructions (e.g., an application) executable with the processing component 922. The application stored in the memory 932 may include one or more modules, each corresponding to a set of instructions. In addition, the processing component 922 is configured to execute instructions to execute the foregoing method.

The device 900 for communication mode determination may further include a power supply component 926 configured to implement power management of the device 900 for communication mode determination, a wired or wireless network interface 950 configured to connect the device 900 for communication mode determination to a network, and an I/O interface 958. The device 900 for communication mode determination may operate an operating system stored in the memory 932, such as Windows Server™, Mac OS X™, Unix™, Linux™, FreeBSD™, or the like.

In an exemplary implementation, a non-transitory computer-readable storage medium is further provided, such as the memory 932 storing computer program instructions. The computer program instructions can be executed by the processing component 922 of the device 900 for communication mode determination to execute the foregoing method.

The disclosure may provide a system, a method, and/or a computer program product. The computer program product may include a computer-readable storage medium, which carries computer-readable program instructions for causing a processor to implement various aspects of the disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples of the computer-readable storage medium include (non-exhaustive list): a portable computer disk, a hard disk, a RAM, a ROM, an EPROM or flash memory, an SRAM, a portable compact disk ROM (CD-ROM), a digital versatile disk (DVD), a memory stick, a floppy disk, a mechanical encoding device, such as a punch card or a convex structure in a groove on which instructions are stored, and any suitable combination of the above. The computer-readable storage medium herein is not interpreted as an instantaneous signal itself, such as a radio wave or other freely propagating electromagnetic wave, an electromagnetic wave propagating through a waveguide or other transmission medium (e.g., an optical pulse through an optical fiber cable), or an electrical signal transmitted through a wire.

The computer-readable program instructions herein may be downloaded from a computer-readable storage medium to various computing/processing devices, or to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions to be stored in the computer-readable storage medium in each computing/processing device.

The computer program instructions for executing the operations of the disclosure may be assembly instructions, instruction set architecture (ISA) instructions, machine instructions, machine related instructions, microcodes, firmware instructions, state setting data, or source codes or object codes written in any combination of one or more programming languages. The programming languages include object-oriented programming languages such as Smalltalk, C++, etc., and conventional procedural programming languages such as "C" language or similar programming languages. The computer-readable program instructions may be executed entirely on a user's computer, partially on the user's computer, as a separate software package, partially on the user's computer and partially on a remote computer, or entirely on the remote computer or server. In the case of a remote computer, the remote computer may be connected to the user's computer through any kind of network, including a LAN or a WAN, or may be connected to an external computer (e.g., connected through an Internet via an Internet service provider). In some implementations, an electronic circuit such as a programmable logic circuit, a field programmable gate array (FPGA), or a programmable logic array (PLA) can be individually customized by utilizing state information of the computer-readable program instructions. The electronic circuit can execute the computer-readable program instructions, to implement various aspects of the disclosure.

Various aspects of the disclosure are described herein with reference to flowcharts and/or block diagrams of the method, the device (system) and the computer program product of implementations of the disclosure. It should be understood that, each block of the flowchart and/or the block diagram and a combination of blocks in the flowchart and/or the block diagram may be implemented by the computer-readable program instructions.

These computer-readable program instructions can be provided to a processor of a general-purpose computer, a special-purpose computer, or other programmable data processing devices, to produce a machine, so that when these instructions are executed by a processor of a computer or other programmable data processing devices, a device for realizing functions/actions specified in one or more blocks in the flowchart and/or the block diagram is generated. These computer-readable program instructions may also be stored in a computer-readable storage medium, to cause a computer, a programmable data processing device, and/or other devices to operate in a specific manner, so that the computer-readable medium storing instructions includes a manufacture, which includes instructions to implement various aspects of the functions/actions specified in one or more blocks in the flowchart and/or the block diagram.

The computer-readable program instructions may also be loaded onto a computer, other programmable data processing devices, or other devices, so that a series of operation steps are performed on the computer, other programmable data processing device, or other devices to generate a computer-implemented process, so that when instructions are executed by the computer, other programmable data processing device, or other devices, the functions/actions specified in one or more blocks in the flowchart and/or the block diagram can be realized.

The flowchart and the block diagram in the accompanying drawings illustrate the architecture, functions and operations of possible implementations of the system, the method, and the computer program product of various implementations of the disclosure. In this regard, each block in the flowchart or the block diagram may represent a part of an instruction, a program segment, or a module, and the part of the instruction, the program segment, or the module contains one or more executable instructions for realizing a specified logical function. In some alternative implementations, the functions marked in the blocks may also occur in a different order than those marked in the drawings. For example, two consecutive blocks may, in fact, be executed basically in parallel, and may sometimes be executed in the opposite order, depending on the function involved. It should also be noted that, each block in the block diagram and/or the flowchart and the combination of blocks in the block diagram and/or the flowchart can be realized by a dedicated hardware-based system implementing specified functions or actions, or realized by a combination of dedicated hardware and computer instructions.

Various implementations of the disclosure have been described above, the foregoing description is exemplary rather than exhaustive, and the disclosure is not limited to the disclosed implementations. Modifications and variations will be apparent to those of ordinary skill in the art without departing from the scope and spirits of the implementations. The terminology used herein was chosen to well explain the principles of the implementations, the practical application, or improvement over the technology in the marketplace, or to enable others of ordinary skill in the art to understand the implementations disclosed herein.

What is claimed is:

1. A method for communication mode determination, applied to a user equipment, the method comprising:
   receiving a plurality of pieces of first data at a plurality of first time-frequency resource locations, the plurality of first time-frequency resource locations being time-frequency resource locations for repeated physical broadcast channel (PBCH) transmission in enhanced machine-type communication (eMTC);
   combining the plurality of pieces of first data to obtain first combined data; and
   decoding and checking the first combined data, and determining that the communication mode is repeated PBCH transmission on condition that decoded data of the first combined data is checked to be correct;
   the method further comprising:
   receiving second data at a second time-frequency resource location, wherein the second time-frequency resource location is a time-frequency resource location for non-repeated PBCH transmission;
   combining the plurality of pieces of first data and the second data to obtain second combined data; and
   decoding and checking the second data and the second combined data, and determining that the communication mode is non-repeated PBCH transmission on condition that the decoded data of the first combined data is checked to be incorrect, decoded data of the second data is checked to be correct, and decoded data of the second combined data is checked to be incorrect.

2. The method of claim 1, further comprising:
   determining that the communication mode is repeated PBCH transmission, on condition that the decoded data of the first combined data is checked to be incorrect, the decoded data of the second data is checked to be incorrect, and the decoded data of the second combined data is checked to be correct.

3. The method of claim 1, further comprising:
   converting the first combined data to obtain first converted data and converting the second data to obtain second converted data, on condition that the decoded data of the first combined data is checked to be incorrect, the decoded data of the second data is checked to be correct, and the decoded data of the second combined data is checked to be correct;
   determining a first similarity between the decoded data of the first combined data and the first converted data, and determining a second similarity between the decoded data of the second data and the second converted data; and
   determining the communication mode according to the first similarity and the second similarity.

4. The method of claim 3, wherein determining the communication mode according to the first similarity and the second similarity comprises:
   determining that the communication mode is repeated PBCH transmission, on condition that the first similarity is higher than the second similarity; and
   determining that the communication mode is non-repeated PBCH transmission, on condition that the first similarity is lower than or equal to the second similarity.

5. The method of claim 3, wherein
   converting the first combined data to obtain the first converted data comprises:
      converting the first combined data into the first converted data according to a positive/negative sign of each piece of data in the first combined data, wherein the first converted data comprises a plurality of pieces of binary data which is same in amount as data comprised in the first combined data; and
   determining the first similarity between the decoded data of the first combined data and the first converted data comprises:
      for each bit of the decoded data of the first combined data, comparing the bit of the decoded data of the first combined data with a corresponding bit of the first converted data to determine a first amount of the same numerical value; and
      determining a ratio of the first amount to the amount of data in the first combined data as the first similarity.

6. The method of claim 3, wherein
   converting the second data to obtain the second converted data comprises:
      converting the second data into the second converted data according to a positive/negative sign of each piece of data in the second data, wherein the second converted data comprises a plurality of pieces of binary data which is same in amount as data comprised in the second data; and determining the second similarity between the decoded data of the second data and the second converted data comprises:

for each bit of the decoded data of the second data, comparing the bit of the decoded data of the second data with a corresponding bit of the second converted data to determine a second amount of the same numerical value; and determining a ratio of the second amount to the amount of data in the second data as the second similarity.

7. The method of claim 1, further comprising:

determining the communication mode by receiving in a next time window a plurality of pieces of first data and/or second data, on condition that the decoded data of the first combined data is checked to be incorrect, the decoded data of the second data is checked to be incorrect, and the decoded data of the second combined data is checked to be incorrect.

8. A device for communication mode determination, comprising:

a transceiver;

a processor, coupled with the transceiver; and a memory, coupled with the transceiver and the processor, and storing processor-executable instructions which, when executed by the processor, cause the processor to:

make the transceiver to receive a plurality of pieces of first data at a plurality of first time-frequency resource locations, the plurality of first time-frequency resource locations being time-frequency resource locations for repeated physical broadcast channel (PBCH) transmission in enhanced machine-type communication (eMTC);

combine the plurality of pieces of first data to obtain first combined data; and decode and check the first combined data, and determine that the communication mode is repeated PBCH transmission on condition that decoded data of the first combined data is checked to be correct;

wherein the processor is further configured to:

make the transceiver to receive second data at a second time-frequency resource location, wherein the second time-frequency resource location is a time-frequency resource location for non-repeated PBCH transmission;

combine the plurality of pieces of first data and the second data to obtain second combined data; and decode and check the second data and the second combined data, and determine that the communication mode is non-repeated PBCH transmission on condition that the decoded data of the first combined data is checked to be incorrect, decoded data of the second data is checked to be correct, and decoded data of the second combined data is checked to be incorrect.

9. The device of claim 8, wherein the processor is further configured to:

determine that the communication mode is repeated PBCH transmission, on condition that the decoded data of the first combined data is checked to be incorrect, the decoded data of the second data is checked to be incorrect, and the decoded data of the second combined data is checked to be correct.

10. The device of claim 8, wherein the processor is further configured to:

convert the first combined data to obtain first converted data and convert the second data to obtain second converted data, on condition that the decoded data of the first combined data is checked to be incorrect, the decoded data of the second data is checked to be correct, and the decoded data of the second combined data is checked to be correct;

determine a first similarity between the decoded data of the first combined data and the first converted data, and determine a second similarity between the decoded data of the second data and the second converted data; and determine the communication mode according to the first similarity and the second similarity.

11. The device of claim 10, wherein the processor configured to determine the communication mode according to the first similarity and the second similarity is configured to:

determine that the communication mode is repeated PBCH transmission, on condition that the first similarity is higher than the second similarity; and determine that the communication mode is non-repeated PBCH transmission, on condition that the first similarity is lower than or equal to the second similarity.

12. The device of claim 10, wherein the processor configured to convert the first combined data to obtain the first converted data is configured to:

convert the first combined data into the first converted data according to a positive/negative sign of each piece of data in the first combined data, wherein the first converted data comprises a plurality of pieces of binary data which is same in amount as data comprised in the first combined data; and the processor configured to determine the first similarity between the decoded data of the first combined data and the first converted data is configured to:

for each bit of the decoded data of the first combined data, compare the bit of the decoded data of the first combined data with a corresponding bit of the first converted data to determine a first amount of the same numerical value; and determine a ratio of the first amount to the amount of data in the first combined data as the first similarity.

13. The device of claim 10, wherein the processor configured to convert the second data to obtain the second converted data is configured to:

convert the second data into the second converted data according to a positive/negative sign of each piece of data in the second data, wherein the second converted data comprises a plurality of pieces of binary data which is same in amount as data comprised in the second data; and the processor configured to determine the second similarity between the decoded data of the second data and the second converted data is configured to:

for each bit of the decoded data of the second data, compare the bit of the decoded data of the second data with a corresponding bit of the second converted data to determine a second amount of the same numerical value; and determine a ratio of the second amount to the amount of data in the second data as the second similarity.

14. The device of claim 8, wherein the processor is further configured to:

determine the communication mode by receiving in a next time window a plurality of pieces of first data and/or second data, on condition that the decoded data of the first combined data is checked to be incorrect, the decoded data of the second data is checked to be incorrect, and the decoded data of the second combined data is checked to be incorrect.

15. A non-transitory computer-readable storage medium, storing computer program instructions which, when executed by a computer, cause the computer to carry out actions, comprising:
   receiving a plurality of pieces of first data at a plurality of first time-frequency resource locations, the plurality of first time-frequency resource locations being time-frequency resource locations for repeated physical broadcast channel (PBCH) transmission in enhanced machine-type communication (eMTC);
   combining the plurality of pieces of first data to obtain first combined data; and
   decoding and checking the first combined data, and determining that the communication mode is repeated PBCH transmission on condition that decoded data of the first combined data is checked to be correct;
   wherein the computer program instructions are further executed by the computer to carry out actions, comprising:
      receiving second data at a second time-frequency resource location, wherein the second time-frequency resource location is a time-frequency resource location for non-repeated PBCH transmission;
      combining the plurality of pieces of first data and the second data to obtain second combined data; and
      decoding and checking the second data and the second combined data, and determining that the communication mode is non-repeated PBCH transmission on condition that the decoded data of the first combined data is checked to be incorrect, decoded data of the second data is checked to be correct, and decoded data of the second combined data is checked to be incorrect.

16. The non-transitory computer-readable storage medium of claim 15, wherein the computer program instructions are further executed by the computer to carry out actions, comprising:
   determining that the communication mode is repeated PBCH transmission, on condition that the decoded data of the first combined data is checked to be incorrect, the decoded data of the second data is checked to be incorrect, and the decoded data of the second combined data is checked to be correct.

17. The non-transitory computer-readable storage medium of claim 15, wherein the computer program instructions are further executed by the computer to carry out actions, comprising:
   converting the first combined data to obtain first converted data and converting the second data to obtain second converted data, on condition that the decoded data of the first combined data is checked to be incorrect, the decoded data of the second data is checked to be correct, and the decoded data of the second combined data is checked to be correct;
   determining a first similarity between the decoded data of the first combined data and the first converted data, and determining a second similarity between the decoded data of the second data and the second converted data; and
   determining the communication mode according to the first similarity and the second similarity.

18. The non-transitory computer-readable storage medium of claim 17, wherein the computer program instructions executed by the computer to carry out actions of determining the communication mode according to the first similarity and the second similarity are executed by the computer to carry out actions, comprising:
   determining that the communication mode is repeated PBCH transmission, on condition that the first similarity is higher than the second similarity; and
   determining that the communication mode is non-repeated PBCH transmission, on condition that the first similarity is lower than or equal to the second similarity.

19. The non-transitory computer-readable storage medium of claim 17, wherein
   the computer program instructions executed by the computer to carry out actions of converting the first combined data to obtain the first converted data are executed by the computer to carry out actions, comprising:
      converting the first combined data into the first converted data according to a positive/negative sign of each piece of data in the first combined data, wherein the first converted data comprises a plurality of pieces of binary data which is same in amount as data comprised in the first combined data; and
   the computer program instructions executed by the computer to carry out actions of determining the first similarity between the decoded data of the first combined data and the first converted data are executed by the computer to carry out actions, comprising:
      for each bit of the decoded data of the first combined data, comparing the bit of the decoded data of the first combined data with a corresponding bit of the first converted data to determine a first amount of the same numerical value; and
      determining a ratio of the first amount to the amount of data in the first combined data as the first similarity.

20. The non-transitory computer-readable storage medium of claim 15, wherein the computer program instructions are further executed by the computer to carry out actions, comprising:
   determining the communication mode by receiving in a next time window a plurality of pieces of first data and/or second data, on condition that the decoded data of the first combined data is checked to be incorrect, the decoded data of the second data is checked to be incorrect, and the decoded data of the second combined data is checked to be incorrect.

* * * * *